United States Patent
Shah et al.

(10) Patent No.: US 6,871,228 B2
(45) Date of Patent: Mar. 22, 2005

(54) METHODS AND APPARATUS IN DISTRIBUTED REMOTE LOGGING SYSTEM FOR REMOTE ADHOC DATA ANALYSIS CUSTOMIZED WITH MULTILEVEL HIERARCHICAL LOGGER TREE

(75) Inventors: Rajeeta Lalji Shah, Austin, TX (US); Lorin Evan Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 09/895,229

(22) Filed: Jun. 29, 2001

(65) Prior Publication Data
US 2003/0005173 A1 Jan. 2, 2003

(51) Int. Cl.[7] .............................................. G06F 15/173
(52) U.S. Cl. ...................... 709/224; 709/200; 709/201; 709/217; 709/220; 709/221
(58) Field of Search .............................. 709/200, 201, 709/217, 220, 221, 224, 254

(56) References Cited

U.S. PATENT DOCUMENTS 5,307,490 A  *  4/1994  Davidson et al. ........... 719/328
5,845,125 A  *  12/1998  Nishimura et al. ......... 717/129
6,430,616 B1  *  8/2002  Brinnand et al. .......... 709/224
6,470,388 B1  *  10/2002  Niemi et al. ............... 709/224

* cited by examiner

Primary Examiner—Nabil El-Hady
(74) Attorney, Agent, or Firm—Duke W. Yee; Jeffrey S. LaBaw; Cathrine K. Kinslow (57) ABSTRACT

A method, program, and system for dynamically configuring logging elements in a computer system are provided. The invention comprises a logging subsystem within the computer system, wherein the subsystem contains a plurality of logging elements which record events within the computer system. Inheritance relationships are established for the logging elements, which allows the logging elements to be configured either individually or as a group. The logging elements are then configured to record specified types of events and send the logging data of the events to specified locations within the computer system. In one embodiment of the present invention, the computer system is one of a plurality of nodes in a distributed computer network, wherein logging elements within a one network node can be remotely configured from a another node in the network.

23 Claims, 8 Drawing Sheets

METHODS AND APPARATUS IN DISTRIBUTED REMOTE LOGGING SYSTEM FOR REMOTE ADHOC DATA ANALYSIS CUSTOMIZED WITH MULTILEVEL HIERARCHICAL LOGGER TREE

CROSS REFERENCE TO RELATED APPLICATIONS

The present application is related to co-pending U.S. patent application Ser. No. 09/895,116 entitled "METHOD AND APPARATUS IN INFORMATION MANAGEMENT SYSTEM PROVIDING ADDING DATA AND BOOKMARKS TO EXISTING INFORMATION LOGGED", to co-pending U.S. patent application Ser. No. 09/895,979 entitled "METHODS AND APPARATUS IN A LOGGING SYSTEM FOR THE TRACKING OF TASKS SOLELY BASED ON FUNCTION DATA ANALYSIS", and to co-pending U.S. patent application Ser. No. 09/895,459 entitled "METHODS AND APPARATUS IN A LOGGING SYSTEM FOR THE ADAPTIVE LOGGER REPLACEMENT IN ORDER TO RECEIVE PRE-BOOT INFORMATION", all filed even date herewith. The content of the above mentioned commonly assigned, co-pending U.S. patent applications are hereby incorporated herein by reference for all purposes.

BACKGROUND OF THE INVENTION

1. Technical Field

The present invention relates generally to computer network environments, and more specifically to logging services in distributed, multilevel architectures.

2. Description of Related Art

Logging is the process of recording system events so that those actions can be reviewed later. Handlers are software objects that direct messages recorded by a logger to a destination. Messages can be directed to a file, a database, a console screen, or to other destinations. Remote logging for distributed computer networks is available for large scale installations. However, current remote logging systems have several drawbacks.

Typically, software components running on remote machines cannot be reconfigured remotely by a system administrator. In addition, current remote logging approaches use a single level hierarchy of logging across multiple machines (i.e. Object Request Brokers (ORBs)). Therefore, all machines receive the same logging handlers and the same logging configuration. No inheritance exists between logging levels.

Current approaches also lack the ability to customize differently each component logging across ORBs. Messages are not in real time, but rather after-the-fact, since Operating System (OS) commands are used against OS specific resources. Methods to stop logging a file (backup) are done manually through a concatenate (Cat) command. Current systems also have inadequate security due to all the logging being sent, regardless of customer the customer viewing the log (multi-customer problems).

Therefore it would be desirable to have a remote logging service that allows remote configuration of logging elements within ORBs and across multiple ORBs.

SUMMARY OF THE INVENTION

The present invention provides a method, program, and system for dynamically configuring logging elements in a computer system. The invention comprises a logging subsystem within the computer system, wherein the subsystem contains a plurality of logging elements which record events within the computer system. Inheritance relationships are established for the logging elements, which allows the logging elements to be configured either individually or as a group. The logging elements are then configured to record specified types of events and send the logging data of the events to specified locations within the computer system.

In one embodiment of the present invention, the computer system is one of a plurality of nodes in a distributed computer network, wherein logging elements within a one network node can be remotely configured from a another node in the network.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
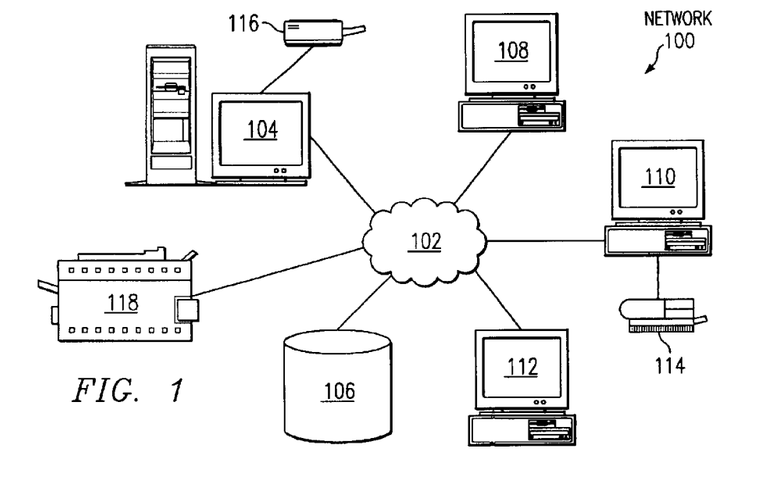
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
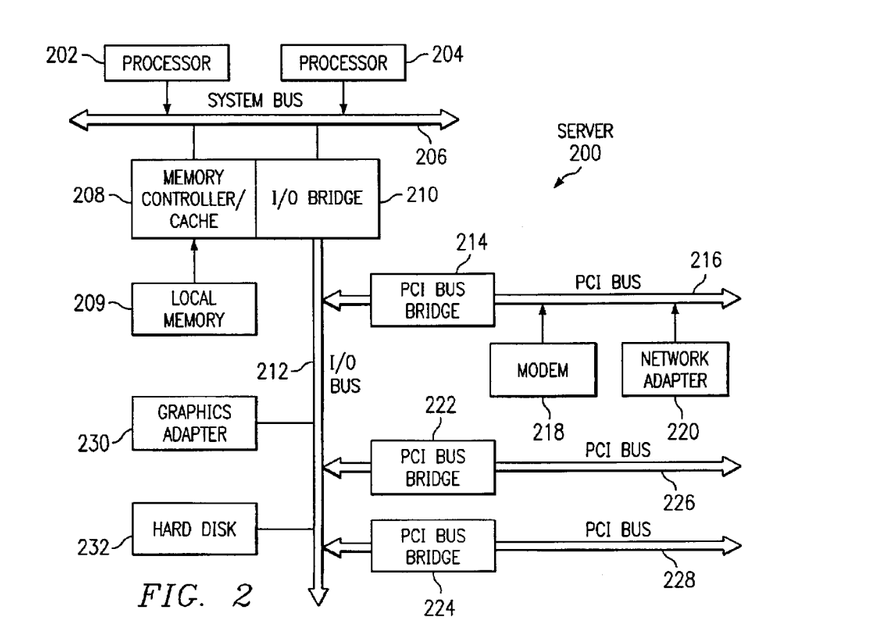
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an eServer pSeries system, a product of International Business Machines Corporation in Armonk, N.Y., running the Advanced Interactive Executive (AIX) or Linux operating systems.

Figure 3:
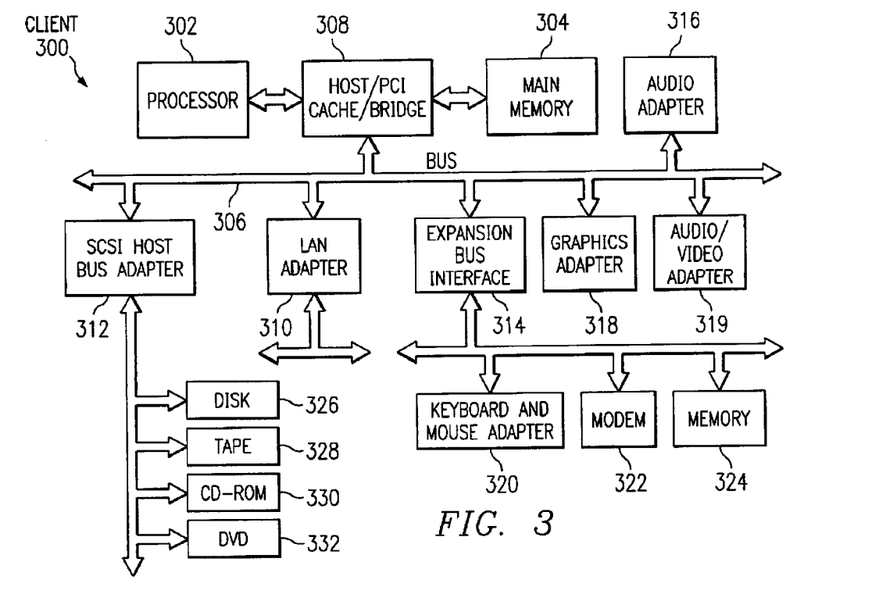
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, CD-ROM drive 330, and DVD drive 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a logging system with distributed, multilevel architecture which allows remote control of logging elements. The present invention also allows the logging system to be used standalone or in a distributed environment. The logging system allows a system to produce large amounts of data for local consumption, as opposed to a small amount of data for storage in a central remote repository. Dual output is easily configured for an administrator wishing to see logs on the console, in multiple files and in a database for future queries.

Furthermore, the present invention provides for the creation and logging of a taskID. This allows a component that is logging to create a task identification (TaskID) which follows this logging task (which may flow across multiple components and ORBs) until completion. The TaskID is passed in the thread context in local methods and in the message context in remote method invocations.

Figure 4:
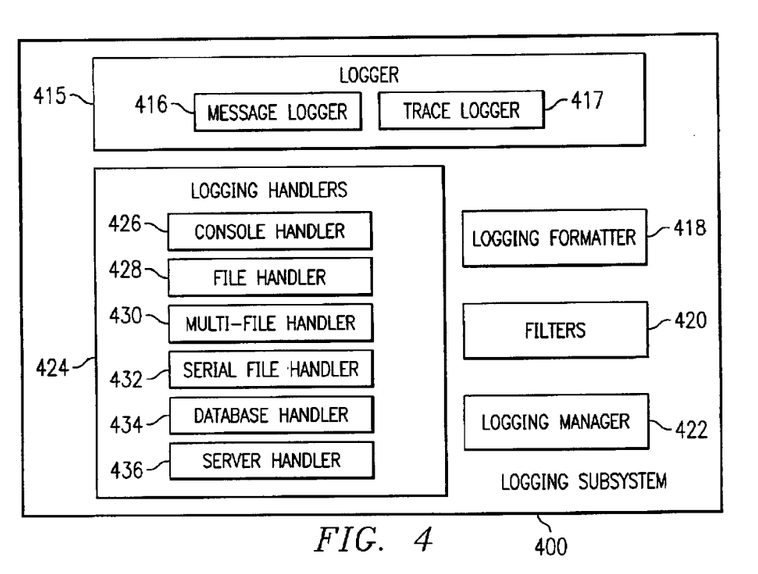
FIG. 4 depicts a schematic diagram illustrating a logging subsystem in accordance with the present invention.

Referring to FIG. 4, a schematic diagram illustrating a logging subsystem is depicted in accordance with the present invention. The logging subsystem 400 uses several objects to record system events. These objects include loggers 415, handlers 424, filters 420 (also referred to as masks), and formatters 418.

Loggers are software objects that record events that occur while a component is operating. The Logging subsystem supports two types of loggers: message loggers 416 and trace loggers 417. Message loggers 416 are used to record textual messages from a component. These messages are internationalized for individual locales. Trace loggers 417 are used to capture information about the operating environment when component code fails to operate as intended. Support personnel use the information captured by trace loggers 417 to trace a problem to its source or to determine why an error occurred. Generally, this information is not enabled by default. Because trace messages are intended for support personnel, they are generally written to a file that can be viewed during a postmortem examination.

Handlers 424 are software objects that direct messages recorded by a logger to a destination. Messages can be directed to a file, a database, a console screen, or to other destinations. Handlers are associated with loggers to send information recorded by a logger to the desired destination. The present invention provides the configuration definitions for the following types of handlers:

Console Handler 426 writes log records to a console.

File Handler 428 writes log records to a file.

Multifile Handler 430 writes log records to a rotating set of log files.

Serial File Handler 432 writes log records to files as serialized objects.

Database Handler 434 writes log records to a database.

Server Handler 436 sends log records in batch mode to a remote logging server for processing.

Filters 420 can be applied to loggers, to handlers, or to both loggers and handlers. When applied to a logger, the filter determines which types of message and trace records the logger processes. When applied to a handler, the filter determines which types of message and trace records the handler sends to a destination. Filter 420 works by comparing a log record type against a set of criteria, or a query, contained within the filter 420.

Formatters 418 are software objects used to format the output of information contained in log records. In general, formatters 418 can be used to tailor things like date and time stamps to local conventions. A single formatter can be used by multiple handlers. Having numerous loggers, handlers, filters, and formatters can cause an undue amount of logging administration to perform. To reduce the administration burden, one can create "groups".

A group contains loggers, handlers, filters, or formatters that have common properties. By creating groups, a newly created logger, handler, filter, or formatter with unset properties can inherit values for those properties from the group. If a logger, handler, filter, or formatter belongs to a group and its properties are updated, all other loggers, handlers, filters or formatters in that group will also have that property updated. This eliminates the need for manually updating individual logger, handler, filter, or formatter properties.

The Log Manager 422 is the heart of the logging system. It creates and configures all of the previously discussed logging objects. It responds to component and application requests to send log messages to handlers and formatters. Each ORB has a log manager associated with it. The handlers may be local or remote with respect to the originating application. It is useful at times to refer to loggers, handlers, filters, and formatters using a generic term that includes one or more of these software objects. The term "logging element" will be used when a reference to a particular kind of logging object, such as a formatter object, is not necessary.

Figure 5:
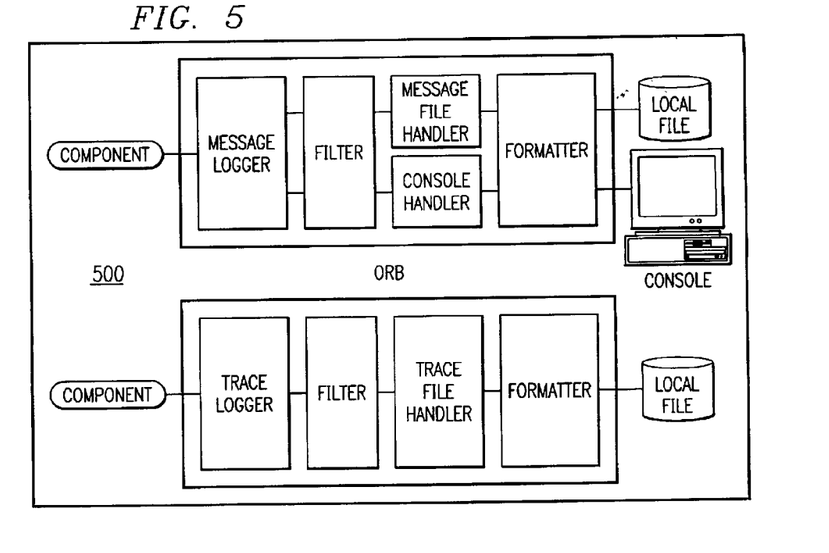
FIG. 5 depicts a schematic diagram illustrating local logging architecture in accordance with the present invention.

Referring to FIG. 5, a schematic diagram illustrating local logging architecture is depicted in accordance with the present invention. In a local logging environment, all components and logging elements are under the control of a single ORB 500. It is recommended that filters be applied to loggers because this keeps the configuration simple and prevents unused data from being passed to handlers.

The present invention can be implemented in either standalone or distributed mode. When operating in standalone mode (or in small installations that do not require scaling), logging is run according to default configuration settings. When operating in distributed mode, the system requires ORB services to allow the distributed logging elements to communicate with each other.

For standalone operations, properties files are created by a configuration utility that stores logging configuration information in a default directory. The default configuration creates handlers that direct message output to a local console and file. The default handlers direct trace output to the file. If the defaults are satisfactory, there is no need to create a handler. When running in standalone, the logging utility needs know two system properties: the location of the root directory for the configuration files, and where the logging output is to be written.

All logging elements in every ORB, and the Logging Service component itself, can be configured dynamically using a logging command line interface (CLI) or a graphical user interface (GUI) console. The logging CLI allows the user to manipulate logging elements from the command line. A Log Manager responds to user requests for logging objects using the logging CLI. When users want to manipulate a logging object, they do so by specifying the name of the object they want to use. The logging subsystem provides handlers that allow one to direct logger output to any number of destinations. Handlers are provided to direct log reports to databases, consoles, log servers, and to a variety of different file types.

The GUI console allows the user to view messages in the desired locale, and find translatable messages based on the language of the user's locale. For example, a component in the New York region issues a log message destined for a file or console in the Paris region. The logger in the New York region logs a message and sends the message to the handler and formatter in Paris. The formatter in Paris looks for a property file (locale(fr)) with French messages. The message is then extracted from the French property file by the message formatter and displayed on the Paris console or written to the Paris log file.

Figure 6:
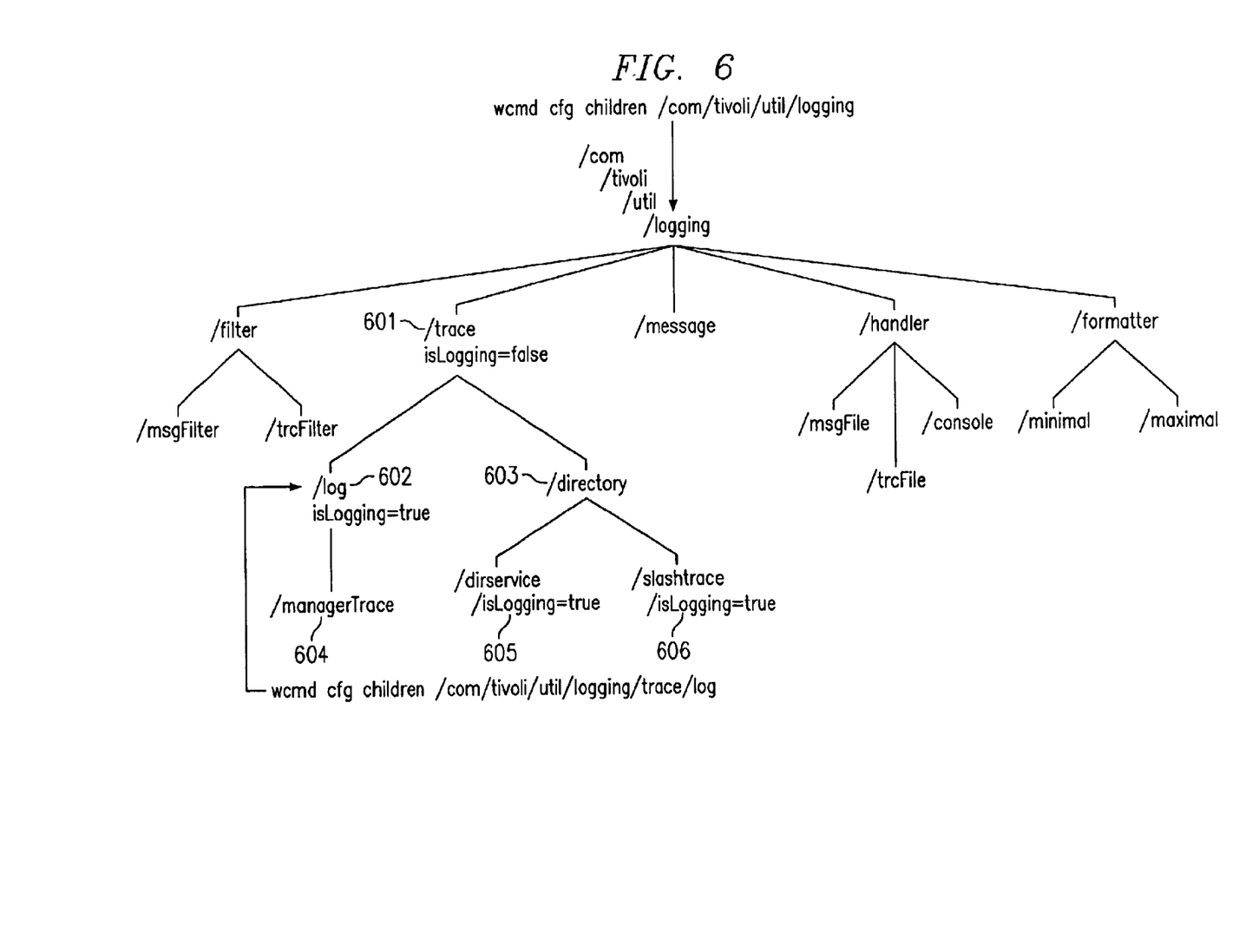
FIG. 6 depicts a diagram illustrating the structure of logging configuration in accordance with the present invention.

Referring now to FIG. 6, a diagram illustrating the structure of logging configuration is depicted in accordance with the present invention. All the logging elements utilize coalescing (or inheritance) to set property values. This means that there is a parent and child relationship. If a property on a child is not set, then it inherits that property from the parent. For example, FIG. 6 shows that the trace node 601 has the property "isLogging-false". Both of its children, the log 602 and directory 603, inherit this property. However, this property in the log group is overridden by setting it to "true". Therefore, the child log 602, manager-Trace 604, has the property "isLogging=true".

The directory group does not override this property itself. This is because directory 603 has a number of trace loggers 605 and 606, and they generate a large amount of trace data. Instead, the individual directory trace loggers, dirservice 605 and slashtrace 606, have the property "isLogging=true".

By using the coalescing relationship between logging elements, administrators can configure logging elements within an ORB individually or as a group.

In addition to the logging element coalescing, the present invention also provides ORB coalescing, which is used for remote configuration of ORBs during adhoc data analysis, as explained below. ORB coalescing allows administrators to remotely configure the logging elements of a single ORB or the logging elements of all ORB's in the network.

Figure 7:
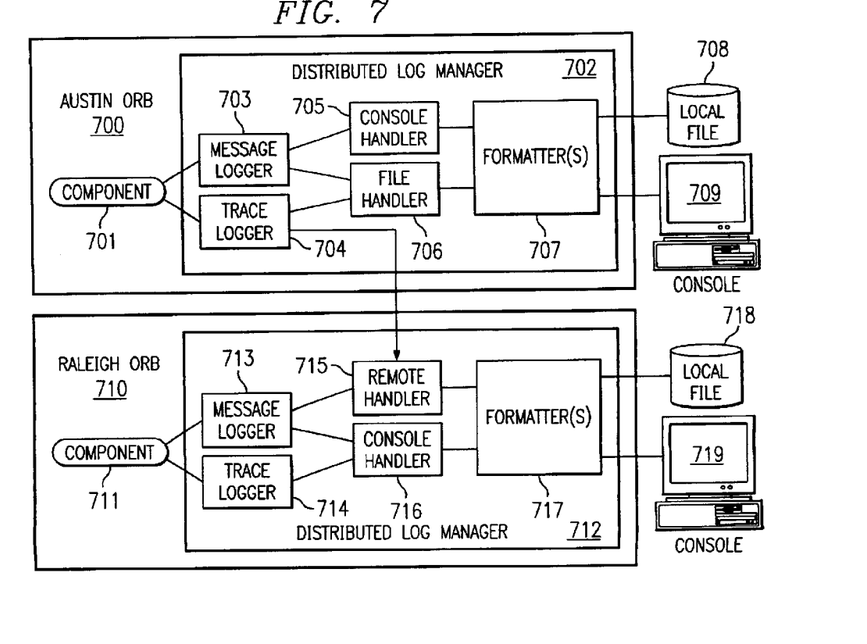
FIG. 7 depicts a schematic diagram illustrating a remote handler in accordance with the present invention.

Referring to FIG. 7, a schematic diagram illustrating a remote handler is depicted in accordance with the present invention. In a distributed logging environment, components can run in one ORB and the logging elements that process the messages from that component can reside in another ORB. How one distributes logging elements will depend on the complexity of one's installation and customer requirements. For example, loggers can run in the same ORB as the component that uses them and the handlers that deliver logged messages can reside in distant ORBs.

In the present example, the component 701 in the Austin ORB 700 can use local logger 703 for messages and local logger 704 for trace data. Component 701 can have the trace data recorded to a local file 708 as well as having it sent to the Raleigh ORB 710, which serves as a central location in this example. For simplicity of illustration, filters are not shown in FIG. 7.

Figure 8:
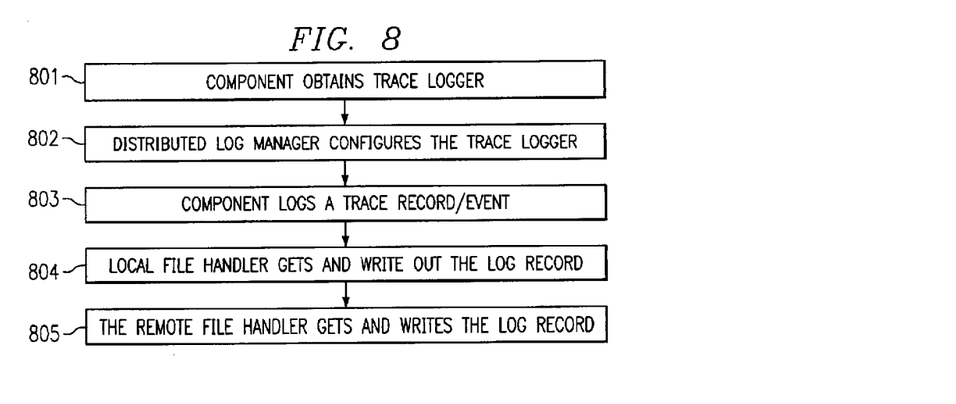
FIG. 8 depicts a flowchart illustrating the functional relationship between the components illustrated in FIG. 7.

Referring to FIG. 8, a flowchart illustrating the functional relationship between the components illustrated in FIG. 7 is depicted in accordance with the present invention. Component 701 obtains a trace logger 704 from Log Manager Factory (step 801). The Distributed Log Manager 702 configures the trace logger 704 by attaching a local file handler 706 on Austin ORB 700 and a proxy of the remote handler 715 on Raleigh ORB 710 (step 802). Component 701 then logs a trace record/event using the trace logger 704 (step 803). The local file handler 706 gets the log record and writes it out using the formatter 707 that is attached to it (step 804). The remote handler 715 also gets the log record and writes it to the local file 718 in the Raleigh ORB 720 using the formatter 717 attached to it (step 805).

Systems administrators can change the association between loggers and handlers and between formatters and handlers using a CLI or GUI console. For example, an administrator could attach a local console handler or file handler to the trace logger and also attach to handlers in a remote ORB to enable logging of trace data to two destinations. This process parallels the configuration tree depicted in FIG. 6. In FIG. 6, the trace logger 606, for example, can be reconfigured without having to reconfigure the parent trace node 601, which would reconfigure all of the other child nodes 602–605. In this way, the log group property can be overridden directly at logger 606, without affecting the property for the rest of the log group.

Referring back to FIG. 7, an administrator at the Raleigh ORB 710 can use a similar process when performing adhoc analysis of trace data from the Austin ORB 700. Using the remote handler 715, the administrator can analyze trace data from Austin ORB 700 and then remotely reconfigure the Austin ORB 700 without having to reconfigure other child ORBs. In this way, the system administrator can debug remote ORBs as needed (adhoc) without having to reconfigure the entire ORB network.

A message logger could also be similarly configured, but for simplicity of illustration, only the trace logger is depicted as logging trace data to two locations.

Figure 9A:
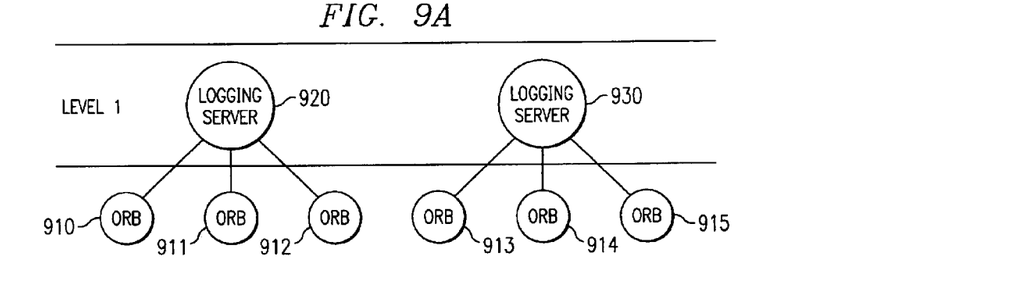
FIG. 9A depicts a schematic diagrams illustrating the use of multiple logging services in accordance with the present invention.
Figure 9B:
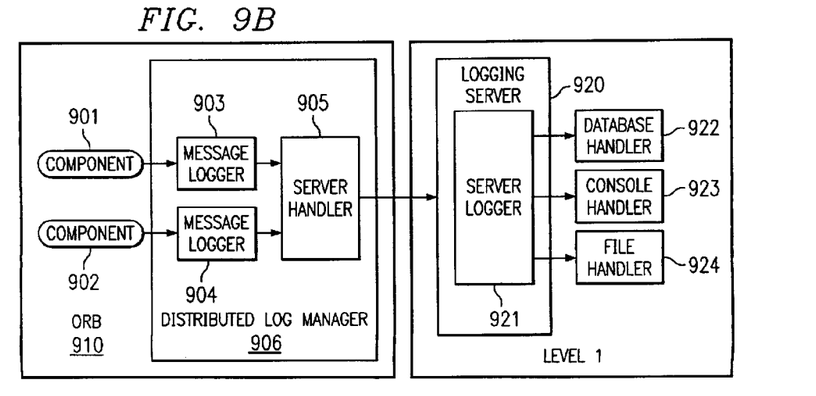
FIG. 9B depicts an exploded view of the ORB/Logging Service illustrated in FIG. 9A.

Referring now to FIGS. 9A and 9B, schematic diagrams illustrating the use of multiple logging services are depicted in accordance with the present invention. FIG. 9B is an exploded view of the ORB/Logging Service illustrated in FIG. 9A. A single Logging Service could be sufficient for small installations with perhaps a hundred or so servers. However, it would not scale for a large system containing thousands of nodes. In this case, it would be better to deploy multiple instances of the Logging Service. The multiple Logging Services can send their output to a single logging database.

The term Logging Service refers to the environment in which server loggers and server handlers pass batched events to another log server for processing. One can centralize one's logging under a single operator, which allows system administrators to retrieve data from across a highly distributed network and view it in one place. Alternatively, if one's installation includes a remote branch location that is geographically separated from the installation depot, then having a local operator monitor logging information is probably advisable. As one's installation grows, the need for multiple Logging Services becomes more acute. One might want to deploy multiple instances of the Logging Service and the logServerHandler.

The Logging Service and the logServerHandler can be used to put messages from different ORBs into a single (remote) log. Trace data should not be put into this log since it will degrade the performance of the system. One should use local logs to collect trace data. Every ORB must use a local logServerHandler to send messages to a Logging Service. When a remote exception occurs, the logServerHandler will write to a local serialized file until it can write again to a Logging Service.

One should use the Logging Service in these situations:
 If it is desirable to have all of the log messages collected in a logging database. For instance, if one wants to keep a record of all the messages from all the ORBs across the system in a single place, then one should use the Logging Service.

Depending on the size of one's installation and how many messages are produced, one might need multiple instances of the Logging Service to be deployed.

This approach may be useful in very large installations, for example, in an ISP environment or in a large corporation with central IT facilities. In such an environment, the customer may want to enable logging at the local level, yet forward message and trace data to a central storage repository for possible evaluation or trend analysis. The Logging Subsystem provides a server handlers to accomplish this function.

Figure 10:
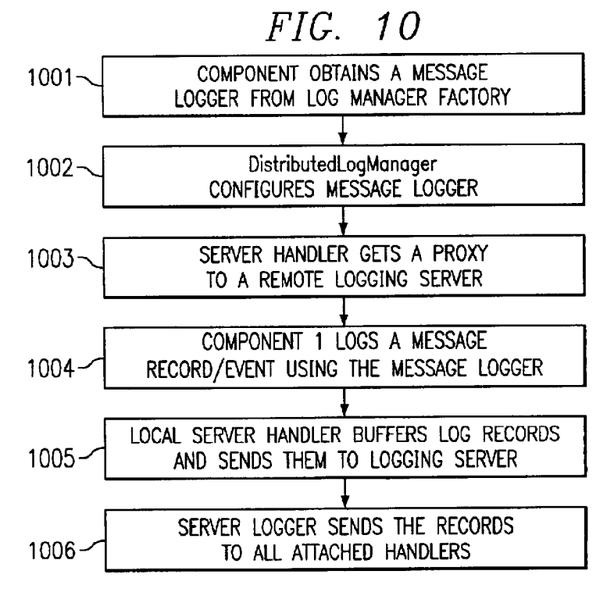
FIG. 10 depicts a flowchart illustrating the functional relationship between the components illustrated in FIGS. 9A and 9B.

Referring to FIG. 10, a flowchart illustrating the functional relationship between the components illustrated in FIGS. 9A and 9B is depicted in accordance with the present invention. Component 901 obtains a message logger 903 from Log Manager Factory (step 1001). The Distributed Log Manager 906 configures the message logger 903 by attaching a local server handler 905 (step 1002). The server handler 905 gets a proxy to a remote logging server 920 (step 1003). Component 901 logs a message record/event using message logger 903 (step 1004). The local server handler 905 buffers the log records, and after it has queued them, sends them in batch to the logging server 920 (step 1005). Logging server 920 has a server logger 921 with three types of handlers attached to it: a database handler 922, a console handler 923, and a file handler 924. The server logger 921 sends the log records to all three attached handlers 922–924 (step 1006).

The server handlers perform error processing to accommodate things like timeouts and handle stale proxies.

Figure 11A:
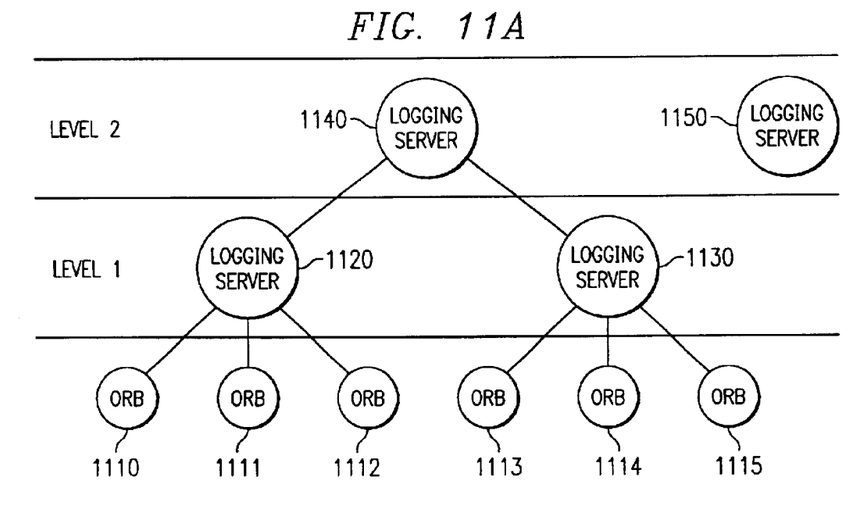
FIG. 11A depicts a schematic diagram illustrating layered logging servers in accordance with the present invention.
Figure 11B:
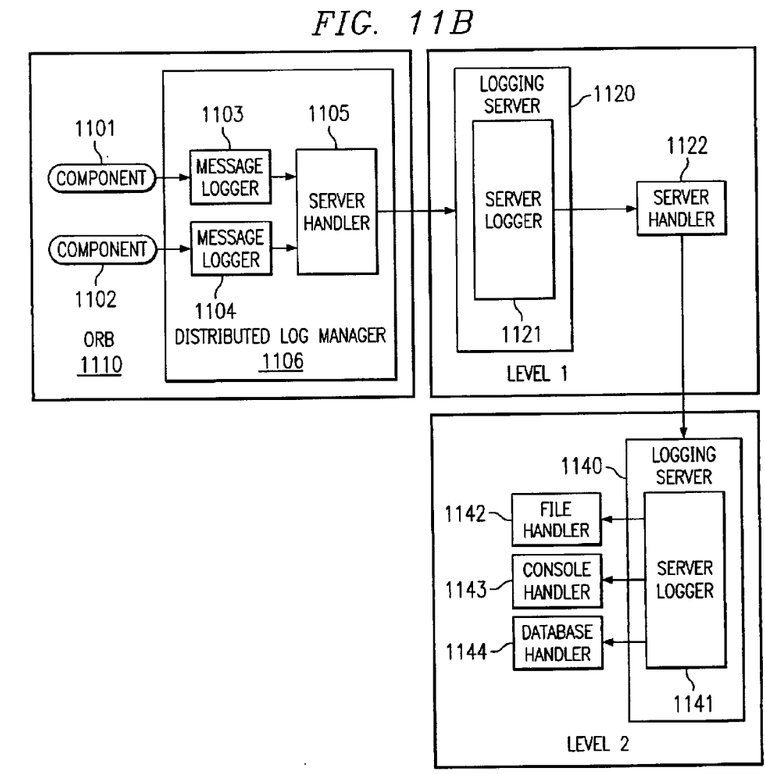
FIG. 11B depicts an exploded view of the ORB/Logging Service illustrated in FIG. 11A.

Referring to FIGS. 11A and 11B, schematic diagrams illustrating layered logging servers are depicted in accordance with the present invention. FIG. 11B depicts an exploded view of the ORB/Logging Service illustrated in FIG. 11A. FIGS. 11A and 11B show how logging servers can be used in a layered fashion to forward events in bulk to a remote logging server for processing. Each level successively batches messages from subordinate levels to other machines. This reduces the incidence of bottlenecks at any one logging server. For example, assuming logging server 1120 is the only logging server for the network, as the number of ORB increases, logging server 1120 might easily become overloaded with message data from the ORBS, which would reduce system performance. By adding additional logging server 1130 to level 1, the information traffic can be divided, thus reducing the processing load on any one logging server. The logging servers 1120 and 1130 on level 1 can then batch their respective log files and convey them to a level 2 logging server.

Figure 12:
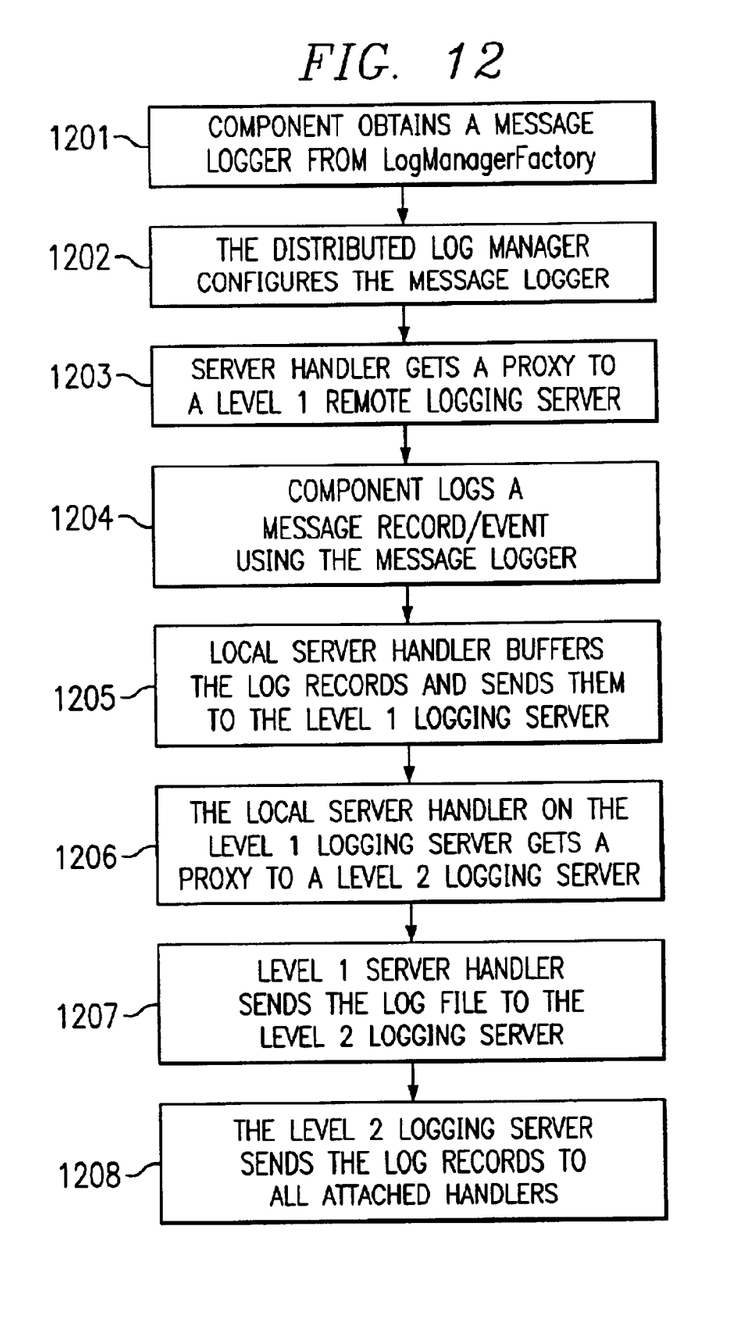
FIG. 12 depicts a flowchart illustrating the functional relationship between the components illustrated in FIGS. 11A and 11B in accordance with the present invention.

Referring to FIG. 12, a flowchart illustrating the functional relationship between the components illustrated in FIGS. 11A and 11B is depicted in accordance with the present invention. Component 1101 obtains a message logger 1103 from Log Manager Factory (step 1201). The Distributed Log Manager 1106 configures the message logger 1103 by attaching a local server handler 1105 (step 1202). The server handler 1105 gets a proxy to a level 1 remote logging server 1120 (step 1203). Component 1101 logs a message record/event using the message logger 1103 (step 1204). The local server handler 1105 buffers the log records and, after it has queued them, send them in batch to the logging server 1120 (step 1205).

The logging server 1120 has a server logger 1121 attached to a local server handler 1122. The level 1 local server handler 1122 gets a proxy to a level 2 remote logging server 1140 (step 1206), and then sends the log records to logging server 1140 (step 1207). The level 2 logging server 1140 has its own local server logger 1141 which is attached to three handlers: a file handler 1142, a console handler 1143, and a database handler 1144. The level 2 server logger 1141 sends the log records to all three handlers 1142–1144 (step 1208).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for dynamically configuring logging elements in a computer system, the method comprising:
   initializing a logging subsystem within the computer system, the logging subsystem comprising a plurality of logging elements which record events within the computer system;
   establishing inheritance relationships for properties of the logging elements within the logging subsystem, wherein the inheritance relationships allow the logging elements to be configured both individually and as a group; and
   configuring the logging elements to record specified types of events and send the logging data of the events to specified locations within the computer system;
   wherein the computer system is one of a plurality of nodes in a distributed computer network, wherein logging elements within a first node in the computer network can be remotely configured from a second node in the computer network.

2. The method according to claim 1, wherein the logging elements comprise at least one of the following:
   message logger;
   trace logger,
   logging handler;
   logging formatter;
   logging filter; and
   log manager.

3. The method according to claim 1, further comprising reconfiguring an individual logging element to send logging data to a new location, in addition to the location specified in the original configuration of that logging element.

4. The method according to claim 1, further comprising creating a taskID which follows a logging task across multiple components until completion.

5. The method according to claim 1, wherein the logging elements are configured by means of a command line interface.

6. The method according to claim 1, wherein the logging elements are configured by means of a graphical user interface.

7. The method according to claim 1, further comprising remotely reconfiguring a logging element to send logging data to at least one other node in the distributed computer network, in addition to the location specified in the original configuration of that logging element.

8. The method according to claim 7, further comprising a taskID which follows a logging task across multiple nodes until completion.

9. The method according to claim 1, further comprising:
establishing inheritance relationships between nodes in the distributed computer network, wherein the inheritance relationships allows logging elements to be remotely configured both within individual nodes and across multiple nodes.

10. The method according to claim 1, further comprising:
configuring logging elements within a plurality of nodes to send logging data to a designated logging server which places the logging data into a single logging database.

11. The method according to claim 10, further comprising:
configuring a plurality of logging servers to send the data in their respective logging databases to a second tier logging server.

12. A computer program product in a computer readable medium, for dynamically configuring logging elements in a computer system, the computer program product comprising:
instructions for initializing a logging subsystem within the computer system, the logging subsystem comprising a plurality of logging elements which record events within the computer system;
instructions for establishing inheritance relationships for properties of the logging elements within the logging subsystem, wherein the inheritance relationships allow the logging elements to be configured both individually and as a group; and
instructions for configuring the logging elements to record specified types of events and send the logging data of the events to specified locations within the computer system;
wherein the computer system is one of a plurality of nodes in a distributed computer network, wherein logging elements within a first node in the computer network can be remotely configured from a second node in the computer network.

13. The computer program product according to claim 12, wherein the logging elements comprise at least one of the following:
message logger;
trace logger;
logging handler;
logging formatter;
logging filter; and
log manager.

14. The computer program product according to claim 12, further comprising instructions for reconfiguring an individual logging element to send logging data to a new location, in addition to the location specified in the original configuration of that logging element.

15. The computer program product according to claim 12, further comprising instructions for creating a taskID which follows a logging task across multiple components until completion.

16. The computer program product according to claim 12, wherein the logging elements are configured by means of a command line interface.

17. The computer program product according to claim 12, wherein the logging elements are configured by means of a graphical user interface.

18. The computer program product according to claim 12, further comprising instructions for remotely reconfiguring a logging element to send logging data to at least one other node in the distributed computer network, in addition to the location specified in the original configuration of that logging element.

19. The computer program product according to claim 18, further comprising a taskID which follows a logging task across multiple nodes until completion.

20. The computer program product according to claim 12, further comprising:
instructions for establishing inheritance relationships between nodes in the distributed computer network, wherein the inheritance relationships allows logging elements to be remotely configured both within individual nodes and across multiple nodes.

21. The computer program product according to claim 12, further comprising:
instructions for configuring logging elements within a plurality of nodes to send logging data to a designated logging server which places the logging data into a single logging database.

22. The computer program product according to claim 21, further comprising:
instructions for configuring a plurality of logging servers to send the data in their respective logging databases to a second tier logging server.

23. A system for dynamically configuring logging elements in a computer system, the system comprising:
a logging subsystem within the computer system, the logging subsystem comprising a plurality of logging elements which record events within the computer system;
a register which establishes inheritance relationships for properties of the logging elements within the logging subsystem, wherein the inheritance relationships allow the logging elements to be configured both individually and as a group; and
a configuring component which configures the logging elements to record specified types of events and send the logging data of the events to specified locations within the computer system;
wherein the computer system is one of a plurality of nodes in a distributed computer network, wherein logging elements within a first node in the computer network can be remotely configured from a second node in the computer network.

* * * * *